US011286966B2

(12) United States Patent
Teragaito et al.

(10) Patent No.: US 11,286,966 B2
(45) Date of Patent: Mar. 29, 2022

(54) RESISTANCE WELDING APPARATUS

(71) Applicant: HONDA MOTOR CO., LTD., Tokyo (JP)

(72) Inventors: Yohei Teragaito, Tochigi-ken (JP); Yoshito Otake, Tochigi-ken (JP); Takuya Furuno, Tochigi-ken (JP); Hiroshi Miwa, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 265 days.

(21) Appl. No.: 16/575,418

(22) Filed: Sep. 19, 2019

(65) Prior Publication Data

US 2020/0096021 A1     Mar. 26, 2020

(30) Foreign Application Priority Data

Sep. 21, 2018     (JP) .............................. JP2018-177254

(51) Int. Cl.
    B23K 11/11        (2006.01)
    B23K 11/31        (2006.01)
    (Continued)

(52) U.S. Cl.
    CPC .......... *F15B 15/262* (2013.01); *B23K 11/115* (2013.01); *B23K 11/28* (2013.01);
    (Continued)

(58) Field of Classification Search
    CPC ..... F15B 15/262; B23K 11/115; B23K 11/28; B23K 11/3009; B23K 11/311; B23K 11/315; B23K 11/317; B23K 11/36
    (Continued)

(56) References Cited

U.S. PATENT DOCUMENTS 7,214,902 B2 * 5/2007 Vanderzwet ......... B23K 11/314
                                                             219/89
8,601,952 B2 * 12/2013 Tamai ................... F16H 57/029
                                                         105/199.2

(Continued)

FOREIGN PATENT DOCUMENTS

JP          06-182560         7/1994
JP          11-266758        10/1999

(Continued)

OTHER PUBLICATIONS

English translation of JP-2010172949-A (Year: 2010).*
Japanese Office Action for Japanese Patent Application No. 2018-177254 dated Mar. 24, 2020.

*Primary Examiner* — Ibrahime A Abraham
*Assistant Examiner* — Chris Q Liu
(74) *Attorney, Agent, or Firm* — Amin, Turocy & Watson, LLP (57) ABSTRACT

A welding gun includes: a moving mechanism portion (ball screw mechanism) for moving a movable electrode back and forth; a motor that includes a rotor and drives the moving mechanism portion to move the movable electrode back and forth; and a brake mechanism that prevents rotation of the rotor during a braking operation, wherein the brake mechanism includes an annular brake disc that is attached to an outer peripheral surface of the rotor and rotates integrally with the rotor, and a clamping portion that prevents rotation of the brake disc by clamping the brake disc during the braking operation.

8 Claims, 7 Drawing Sheets

(51) Int. Cl.
*B23K 11/30* (2006.01)
*B23K 11/28* (2006.01)
*F15B 15/26* (2006.01)

(52) U.S. Cl.
CPC ......... *B23K 11/3009* (2013.01); *B23K 11/311* (2013.01); *B23K 11/315* (2013.01)

(58) Field of Classification Search
USPC .............................................. 219/86.25, 136
See application file for complete search history.

(56) References Cited

U.S. PATENT DOCUMENTS

| | | | | |
|---|---|---|---|---|
| 8,754,347 B2 * | 6/2014 | Murai | ................... | B23K 11/315 |
| | | | | 219/86.25 |
| 2004/0208031 A1 * | 10/2004 | Miwa | ................... | B23K 11/315 |
| | | | | 363/141 |
| 2011/0147355 A1 * | 6/2011 | Miwa | ................... | B23K 11/315 |
| | | | | 219/136 |

FOREIGN PATENT DOCUMENTS

| | | | |
|---|---|---|---|
| JP | 4243774 | | 3/2009 |
| JP | 2010172949 A | * | 8/2010 |
| JP | 2015-133841 | | 7/2015 |

* cited by examiner

RESISTANCE WELDING APPARATUS

CROSS-REFERENCE TO RELATED APPLICATION

This application is based upon and claims the benefit of priority from Japanese Patent Application No. 2018-177254 filed on Sep. 21, 2018, the contents of which are incorporated herein by reference.

BACKGROUND OF THE INVENTION

Field of the Invention

The present invention relates to a resistance welding apparatus that welds a workpiece by conducting electricity through the workpiece via electrodes.

Description of the Related Art

Japanese Laid-Open Patent Publication No. 06-182560 discloses a spot welding device (resistance welding apparatus) that welds a workpiece by conducting electricity through the workpiece via electrodes.

The spot welding device of Japanese Laid-Open Patent Publication No. 06-182560 includes a pressing mechanism portion (moving mechanism portion) for moving an electrode back and forth. This pressing mechanism portion includes a pressing cylinder and a braking means that can apply a braking force to a cylinder rod of the pressing cylinder.

SUMMARY OF THE INVENTION

The braking means of the spot welding device disclosed in Japanese Laid-Open Patent Publication No. 06-182560 cannot be adopted in a mechanism that uses, as the drive source, a motor having a rotor. Furthermore, a portion of the braking means is positioned far from the cylinder rod, and this causes a problem that the size of the spot welding device is increased.

The present invention has been made by taking the above into consideration, and it is an object of the present invention to provide a resistance welding apparatus that can apply a braking force to a rotor of a motor that causes an electrode to move back and forth, and can restrict the increase in size caused by providing a brake mechanism.

An aspect of the present invention is a resistance welding apparatus that welds a workpiece by conducting electricity through the workpiece via an electrode, the resistance welding apparatus comprising an electrode moving mechanism configured to move the electrode back and forth, wherein the electrode moving mechanism includes a moving mechanism portion configured to move the electrode back and forth, a motor including a rotor and configured to drive the moving mechanism portion to move the electrode back and forth, and a brake mechanism configured to prevent rotation of the rotor during a braking operation, and wherein the brake mechanism includes an annular brake disc attached to an outer peripheral surface of the rotor and configured to rotate integrally with the rotor, and a clamping portion configured to prevent rotation of the brake disc by clamping the brake disc during the braking operation.

According to the present invention, it is possible to prevent the rotation of the brake disc, which is attached to the outer peripheral surface of the rotor of the motor, by clamping the brake disc with the clamping portion during the braking operation. Therefore, it is possible to apply the braking force to the rotor of the motor that causes the electrode to move back and forth, and to restrict an increase in the size of the resistance welding apparatus caused by providing the brake mechanism.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The following describes preferred embodiments of a resistance welding apparatus according to the present invention, while referencing the accompanying drawings.

Figure 1:
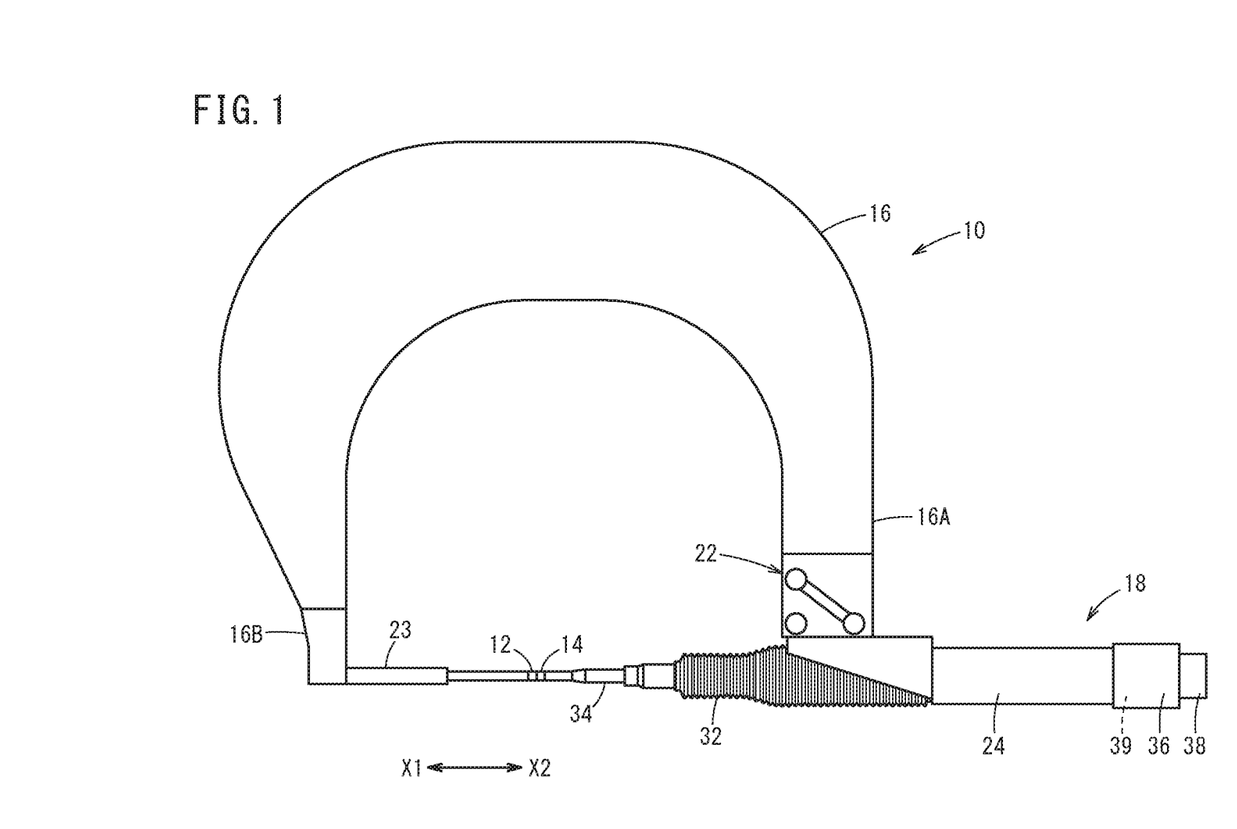
FIG. 1 is a side view of an overall configuration of a welding gun according to the present embodiment.

FIG. 1 is a side view of an example of a configuration of a welding gun (resistance welding apparatus) 10. The welding gun 10 is a resistance welding apparatus that welds a workpiece by conducting electricity through the workpiece via electrodes. Specifically, the welding gun 10 is a resistance welding apparatus that sandwiches and applies pressure to a workpiece, in which a plurality of boards are stacked, using a fixed electrode 12 and a movable electrode 14 and causes a welding current to flow between the fixed electrode 12 and the movable electrode 14, thereby performing spot bonding of the workpiece.

The welding gun 10 is used by a welding robot, for example. As shown in FIG. 1, the welding gun 10 includes, in addition to the fixed electrode 12 and the movable electrode 14, an arm 16 that holds the fixed electrode 12 and an electrode moving mechanism 18 that causes the movable electrode 14 to move back and forth. Specifically, the electrode moving mechanism 18 causes the movable electrode 14 to move in the X-axis direction, which is one axial direction including a direction toward the fixed electrode 12 (X1 direction) and a direction away from the fixed electrode 12 (X2 direction). In other words, the direction in which the movable electrode 14 moves back and forth is the X-axis direction.

The arm 16 is formed by a substantially U-shaped member, and one end 16A of this U shape is attached to a housing 24, described further below, via an attachment portion 22. Another end 16B of this U-shaped arm 16 is provided with a long and thin electrode attaching member 23 that extends in the X2 direction from the other end 16B. The fixed electrode 12 is fixed on the X2-side end portion of the electrode attaching member 23.

Figure 2:
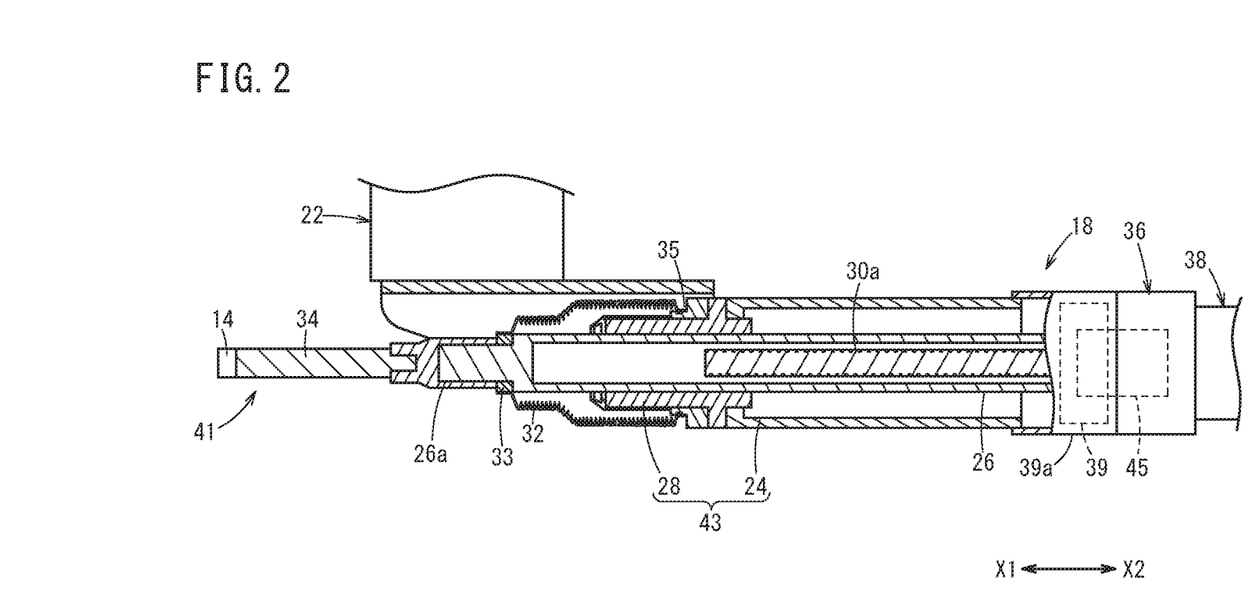
FIG. 2 is a cross-sectional view showing when an electrode moving mechanism of the welding gun is in a fully contracted state.
Figure 3:
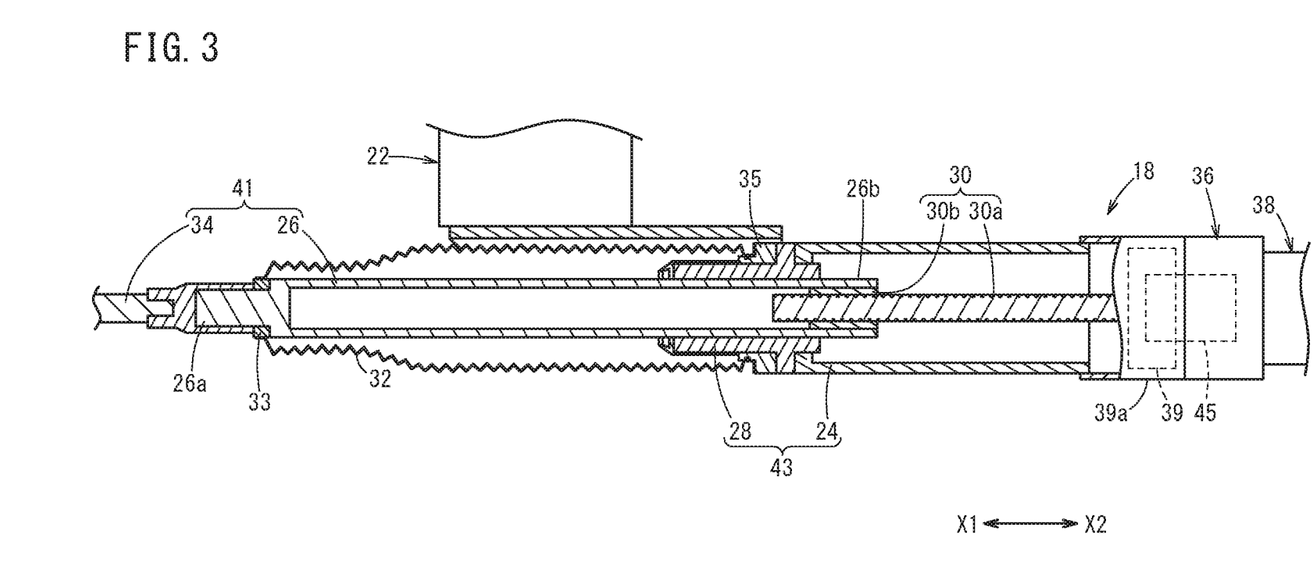
FIG. 3 is a cross-sectional view showing when the electrode moving mechanism of the welding gun is in a fully expanded state.

FIG. 2 is a cross-sectional view of the electrode moving mechanism 18 of the welding gun 10 and surrounding region when the electrode moving mechanism 18 is contracted (when the movable electrode 14 is farthest from the fixed electrode 12). FIG. 3 is a cross-sectional view of the electrode moving mechanism 18 of the welding gun 10 and surrounding region when the electrode moving mechanism 18 is expanded (when the movable electrode 14 is closest to the fixed electrode 12).

As shown in FIGS. 2 and 3, the electrode moving mechanism 18 includes a first mechanism portion 41 that holds the movable electrode 14, a second mechanism portion 43 capable of moving in the X-axis direction relative to the first mechanism portion 41, and a ball screw mechanism (moving mechanism portion) 30 for moving the first mechanism portion 41 and the second mechanism portion 43 relative to each other. Furthermore, the electrode moving mechanism 18 includes a motor 36 that has a rotor 45 and drives the ball screw mechanism 30 to move the movable electrode 14 back and forth, and a brake mechanism 39 that stops the rotation of the rotor 45 during a braking operation.

The first mechanism portion 41 includes a shaft 26 and an electrode attaching member 34 for attaching the movable electrode 14 to the shaft 26.

The shaft 26 is a hollow member that extends in the X-axis direction, and includes a front end portion 26a on the X1 side and a rear end portion 26b on the X2 side. The shaft 26 includes an open portion that opens in the X-axis direction, in each of the front end portion 26a and the rear end portion 26b. The movable electrode 14 is fixed to the front end portion 26a of the shaft 26, via the long and thin electrode attaching member 34 that extends in the X-axis direction (see FIG. 2). The movable electrode 14 faces the fixed electrode 12 in the X-axis direction (see FIG. 1). In other words, the movable electrode 14 and the fixed electrode 12 are positioned on the same axial line that is parallel to the X-axis. A portion of the shaft 26 is covered by a cover member 32 capable of expanding and contracting in accordance with relative displacement between the first mechanism portion 41 and the second mechanism portion 43.

The second mechanism portion 43 includes the housing 24 capable of housing at least a portion of the shaft 26, and a tube-shaped support member 28 that supports the shaft 26.

The housing 24 is formed by a tube-shaped member capable of housing a portion of the shaft 26 and extending in an axial direction of the shaft 26 (X-axis direction). The support member 28 is attached at an open end portion of the housing 24 on the X1 side. The support member 28 is formed by a tube-shaped member that functions as a thrust bearing that supports the shaft 26 on an inner periphery thereof to be slidable in the axial direction. A portion of the support member 28 is covered by the cover member 32. The housing 24 also functions as a gripping portion that is gripped by the welding robot.

The cover member 32 is a member for protecting the shaft 26 and the support member 28. The cover member 32 is a bellows-shaped member that can expand and contract in the X-axis direction (e.g. a member made of rubber). An end portion of the cover member 32 on the movable electrode 14 side (X1 side) is attached near the front end portion 26a of the shaft 26, via an annular cover attachment member 33. An end portion of the cover member 32 on the housing 24 side (X2 side) is attached to the support member 28, via a cover attachment member 35 that covers a portion of the support member 28 (portion on the X1 side). The cover member 32 does not necessarily need to be provided.

The ball screw mechanism 30 functions as a moving mechanism portion for moving the movable electrode 14 back and forth. More specifically, the ball screw mechanism 30 is a mechanism for moving the first mechanism portion 41 that holds the movable electrode 14 in the axial direction of the shaft 26 (X-axis direction). As shown in FIG. 3, the ball screw mechanism 30 includes a screw shaft 30a that extends in the X-axis direction and rotates by being driven by the motor 36, and a nut 30b that screws onto the screw shaft 30a. An end portion of the screw shaft 30a at least on the movable electrode 14 side (X1 side) is inserted into the shaft 26, from the rear end portion 26b of the shaft 26. The end portion of the screw shaft 30a on the motor 36 side (X2 side) is provided with a fixed portion 30a1 (see FIG. 4) that is fixed to the rotor 45 of the motor 36. The nut 30b is fitted to (fixed to) the rear end portion 26b of the shaft 26 to be positioned coaxially with the shaft 26. In this way, the shaft 26 is provided coaxially with the screw shaft 30a, and is displaced in the axial direction of the rotor 45 (X-axis direction) in accordance with the rotation of the screw shaft 30a.

A drive force of the motor 36 (see FIG. 1) is transmitted to the screw shaft 30a as a rotational force around the X-axis. When the motor 36 operates, the screw shaft 30a rotates around the X-axis. When the screw shaft 30a rotates in one direction around the X-axis, the nut 30b, the shaft 26, and the movable electrode 14 move together in the X1 direction. When the screw shaft 30a rotates in the other direction around the X-axis, the nut 30b, the shaft 26, and the movable electrode 14 move together in the X2 direction. In other words, by causing the rotor 45 of the motor 36 to rotate in a forward direction or a reverse direction, it is possible to move the movable electrode 14 and the shaft 26 in the X1 direction or the X2 direction. In this way, the motor 36 drives the ball screw mechanism 30 to cause the movable electrode 14 to move back and forth. When the electrode moving mechanism 18 is in the fully contracted state (see FIG. 2), the amount of the screw shaft 30a inserted into the shaft 26 becomes maximum. When the electrode moving mechanism 18 is in the fully expanded state (see FIG. 3), the amount of the screw shaft 30a inserted into the shaft 26 becomes minimum.

Here, the ball screw mechanism 30 is used as the moving mechanism portion, but the moving mechanism portion may be any mechanism as long as it is capable of converting the rotational force of the motor 36 into a translational force. A rack-and-pinion mechanism or the like, for example, can be used as the moving mechanism portion.

As shown in FIG. 1, an encoder 38 that detects the rotational angle of the rotor 45 of the motor 36 is provided on the rear end side (X2 side) of the motor 36. The motor 36 is controlled by a control section (not shown in the drawings) of the welding robot, based on the detection results of the encoder 38 and the like. The encoder 38 includes an encoder housing 38a (only a portion of which is shown in FIG. 4), and an encoder body 38b (only a portion of which is shown in FIG. 4) that is housed in the encoder housing 38a.

Figure 4:
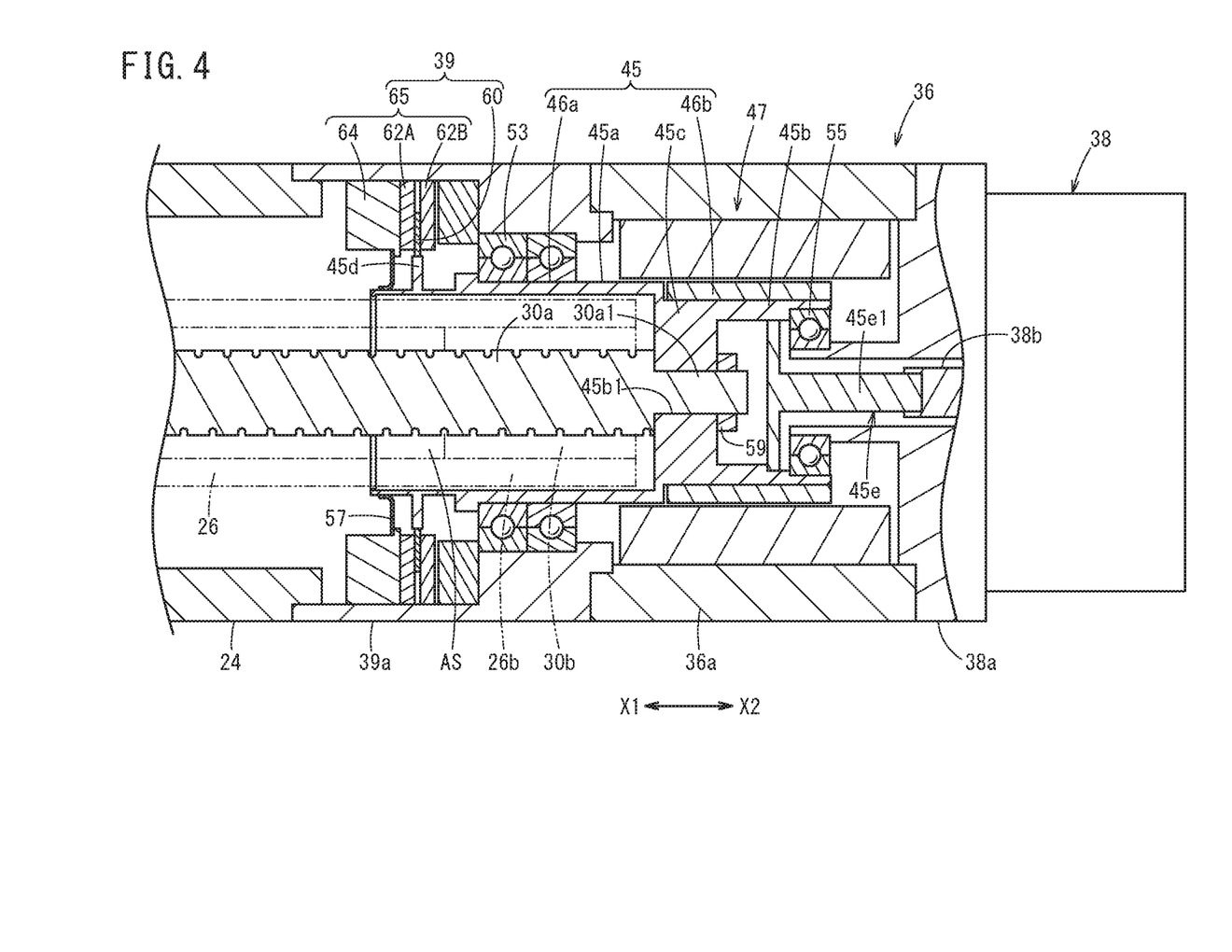
FIG. 4 is a cross-sectional view of a motor and a brake mechanism of the electrode moving mechanism.

FIG. 4 is a cross-sectional view of the motor 36 and the brake mechanism 39. As shown in FIG. 4, the motor 36 includes, in addition to the rotor 45, a stator 47, and a motor housing 36a that houses the rotor 45 and the stator 47.

The stator 47 includes a coil (not shown in the drawings), and is fixed to the inner periphery of the motor housing 36a.

The rotor 45 is arranged on the inner peripheral side of the stator 47, in a manner to be positioned coaxially with the screw shaft 30*a*. The rotor 45 includes a hollow portion. The rotor 45 includes a rotor body 46*a* that is joined to the screw shaft 30*a*, and a magnet 46*b* that is supported by the rotor body 46*a*. Specifically, the rotor body 46*a* includes two hollow portions 45*a* and 45*b* lined up in the axial direction (X-axis direction), and a joining portion 45*c* that is positioned between the hollow portions 45*a* and 45*b* and joins the hollow portions 45*a* and 45*b* together. In other words, the rotor 45 is open at the front end side (X1 side) and the rear end side (X2 side). In the rotor 45, the hollow portion 45*a* has a long tube shape and is positioned on the front end side, and the hollow portion 45*b* has a short tube shape and is positioned on the rear end side.

The hollow portion 45*a* of the rotor 45 is housed straddling a brake housing 39*a* and the motor housing 36*a*. The hollow portion 45*a* is rotatably supported by a bearing 53 (e.g. a ball bearing) arranged between the rotor 45 and the brake housing 39*a* that houses the rotor 45 (a portion of the motor 36). Specifically, an intermediate portion of the hollow portion 45*a* in the axial direction is supported by the brake housing 39*a* via the bearing 53.

The majority of the hollow portion 45*a* from the front end (X1-side end) to the rear end side (X2 side) is arranged within the brake housing 39*a*.

The bearing 53 is arranged between the stator 47 of the motor 36 and the brake mechanism 39. The bearing 53 surrounds the hollow portion 45*a*. Depending on conditions such as the length of the magnet 46*b* in the axial direction, the length of the joining portion 45*c*, and the length of the hollow portion 45*b*, the bearing 53 may be formed to surround the joining portion 45*c*, or to surround the hollow portion 45*b*.

Here, a portion of the screw shaft 30*a* (portion on the X2 side) is inserted into the rotor 45 through an open portion that is open at the front end of the hollow portion 45*a* of the rotor 45, but this portion does not necessarily need to be inserted in this manner. Furthermore, the bearing 53 is arranged between the stator 47 of the motor 36 and the brake mechanism 39, but the positioning is not limited to this. As an example, the brake mechanism 39 may be arranged between the bearing 53 and the stator 47.

An annular space AS capable of receiving the end portion of the shaft 26 on the rotor 45 side (the rear end portion 26*b*) is formed between the hollow portion 45*a* and the screw shaft 30*a*. The annular space AS does not necessarily need to be formed. In FIG. 4, the nut 30*b* fixed to the end portion of the shaft 26 on the rotor 45 side is shown by a two-dot chain line.

The hollow portion 45*b* of the rotor 45 is arranged inside the motor housing 36*a*. The inner periphery of an open end portion of the hollow portion 45*b* on the rear end side (X2 side) is supported by an inner peripheral end portion of the encoder housing 38*a* on the rotor 45 side (X1 side), via a bearing 55 (e.g. a ball bearing). The inner peripheral end portion of the encoder housing 38*a* on the X1 side is shaped as a pipe extending in the X-axis direction, and a portion thereof enters the hollow portion 45*b* from the open end portion of the hollow portion 45*b* on the X2 side. The inner periphery of the hollow portion 45*b* is provided with a connecting portion 45*e* that is connected to the encoder body 38*b* and includes an insertion portion 45*e*1 that is inserted into the inner peripheral end portion of the encoder housing 38*a* on the X1 side. The magnet 46*b* is provided on the outer periphery of the hollow portion 45*b*.

The joining portion 45*c* of the rotor 45 is arranged inside the motor housing 36*a*. The joining portion 45*c* is provided with a through-hole 45*b*1 penetrating therethrough in the axial direction (X-axis direction) of the rotor 45. The fixed portion 30*a*1 of the screw shaft 30*a* is inserted through the through-hole 45*b*1. A portion of the fixed portion 30*a*1 that protrudes from the through-hole 45*b*1 to the rear end side (X2 side) is fixed by an annular fixing member 59. As a result, the rotor 45 and the screw shaft 30*a* are joined in a manner to be unable to rotate relative to each other.

In the present embodiment, the rotor 45 includes the hollow portions 45*a* and 45*b* and the joining portion 45*c*, but at least one of the hollow portions 45*a* and 45*b*, and the joining portion 45*c* may be omitted. The rotor 45 may be semi-hollow, hollow, or solid.

Figure 5:
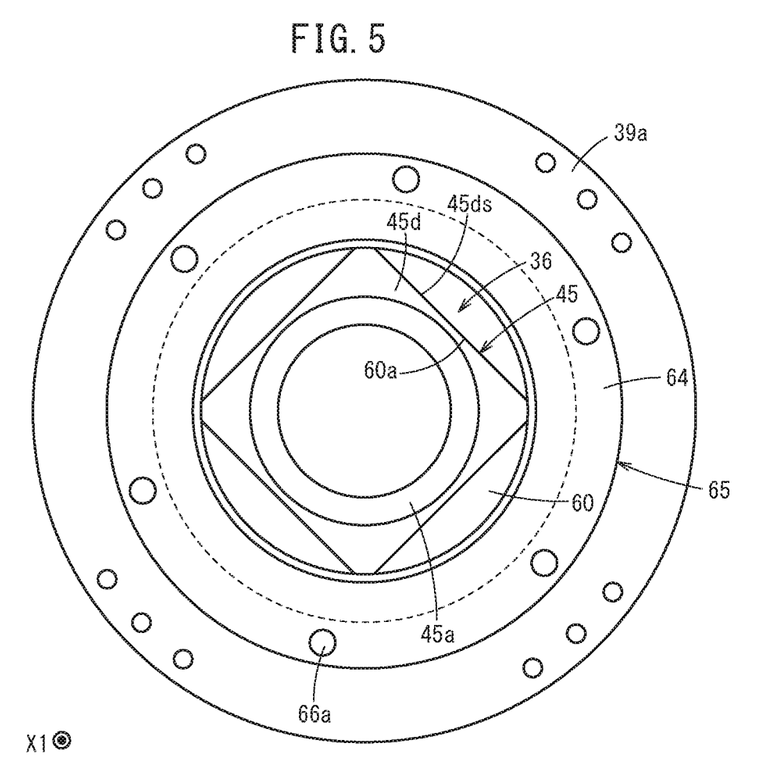
FIG. 5 is a view of the brake mechanism and the motor as seen from the housing side (X1 side)

FIG. 5 is a view of the motor 36 and a portion of the brake mechanism 39 as seen from the front end side of the rotor 45 (X1 side). As shown in FIGS. 4 and 5, the rotor 45 includes an attachment portion 45*d* to which a brake disc 60 described further below is attached, the attachment portion 45*d* having an outer peripheral surface with a shape other than a circle. Specifically, the attachment portion 45*d* is formed by an annular portion having an outer peripheral shape that is substantially a rectangular shape, and protrudes radially outward from the outer periphery of the hollow portion 45*a* near an open end portion on the front end side (X1 side) thereof. More specifically, the attachment portion 45*d* is formed by an annular portion having an outer peripheral shape that is substantially a square shape.

Here, the outer peripheral shape of the attachment portion 45*d* provided to the rotor 45 is described as being a substantially rectangular shape, but may be a polygonal shape other than the rectangular shape (including a triangular shape), as long as the outer peripheral shape is not circular.

An annular seal member 57 that surrounds the hollow portion 45*a* is provided between the brake housing 39*a* and a position near the open end portion on the X1 side of the outer circumferential surface of the hollow portion 45*a* of the rotor 45 (a position closer to the X1 side than the attachment portion 45*d*). The annular seal member 57 is capable of sliding on the outer circumferential surface of the hollow portion 45*a*.

It should be noted that, when the movable electrode 14 is not moved back and forth, i.e. when the motor 36 is not operated during the spot welding with the welding gun 10, the moving of the welding gun 10, or the like, it is preferable to stop the rotation of rotating portions including the rotor 45 and the screw shaft 30*a*, in order to stop the movement of the movable electrode 14. This is because, when the load of the first mechanism portion 41 holding the movable electrode 14 is applied to the screw shaft 30*a* via the nut 30*b*, it is possible that the screw shaft 30*a* rotates and the movable electrode 14, the first mechanism portion 41, and the nut 30*b* unintentionally move to the second mechanism portion 43 side (in the X2 direction). Therefore, the brake mechanism 39 that applies a braking force to the rotor 45 to stop the rotation of the rotor 45 when the motor 36 is not operated (during the braking operation) is mounted on the welding gun 10.

As shown in FIG. 4, the brake mechanism 39 is housed in the brake housing 39*a*. The brake mechanism 39 is provided at the front end side of the rotor 45. The brake mechanism 39 may be provided at an intermediate portion between the front end portion and the rear end portion of the rotor 45, or may be provided on the rear end side of the rotor 45.

The brake mechanism 39 surrounds the hollow portion 45*a* of the rotor 45. The brake mechanism 39 may surround the joining portion 45c of the rotor 45, or may surround the hollow portion 45b of the rotor 45.

The brake mechanism 39 surrounds the screw shaft 30a. The brake mechanism 39 does not necessarily need to surround the screw shaft 30a.

The brake mechanism 39 is provided near the housing 24 functioning as a gripping portion that is gripped by the welding robot. The brake mechanism 39 may instead be provided at a position far from the housing 24.

The brake housing 39a is formed by a tube-shaped member that extends in the axial direction of the rotor 45 (X-axis direction), and an open end portion of the brake housing 39a on the X1 side is connected to an open end portion of the housing 24 on the X2 side by screwing, for example. An open end portion of the brake housing 39a on the X2 side is connected to the outer peripheral end portion of the encoder housing 38a on the X1 side by screwing, for example.

The brake mechanism 39 includes the annular brake disc 60 and a clamping portion 65 that stops the rotation of the brake disc 60 by clamping the brake disc 60 during the braking operation.

The brake disc 60 is attached to the outer peripheral surface of the rotor 45, and rotates integrally with the rotor 45. Specifically, an inner peripheral surface 60a of the brake disc 60 is fitted to the outer peripheral surface of the attachment portion 45d so as not to be rotatable relative to each other, and the brake disc 60 is capable of being displaced (e.g. sliding) relative to the attachment portion 45d in the axial direction of the rotor 45 (X-axis direction). As shown in FIG. 5, the inner peripheral surface 60a of the brake disc 60 has a substantially rectangular shape that is similar to an outer circumferential surface 45ds of the attachment portion 45d, and is slightly larger than outer circumferential surface 45ds. The inner peripheral surface 60a of the brake disc 60 is fitted to the outer peripheral surface of the attachment portion 45d of the rotor 45, but the configuration is not limited to this, and the brake disc 60 may be attached to the outer peripheral surface of the rotor 45 and rotate integrally with the rotor 45.

The clamping portion 65 includes a pair of friction members 62A and 62B, and an electromagnet 64.

The pair of friction members 62A and 62B face each other in the axial direction of the rotor 45 (X-axis direction) in a manner to sandwich the brake disc 60. Here, the pair of friction members 62A and 62B are formed by magnetic bodies that have relatively large coefficients of friction and are shaped as annular plates of the same shape and size. In FIG. 4, the brake mechanism 39 in the braking operation state is shown, and the brake disc 60 is clamped by the pair of friction members 62A and 62B. The pair of friction members 62A and 62B are biased in a direction to move away from each other by a leaf spring (not shown in the drawings). Here, the pair of friction members 62A and 62B are each a magnetic body, but only at least the friction member 62B (the friction member that is farther from the electromagnet 64 among the pair of friction members 62A and 62B) needs to include a magnetic body. Hereinafter, the pair of friction members 62A and 62B are also referred to collectively as a "friction member pair".

Figure 6:
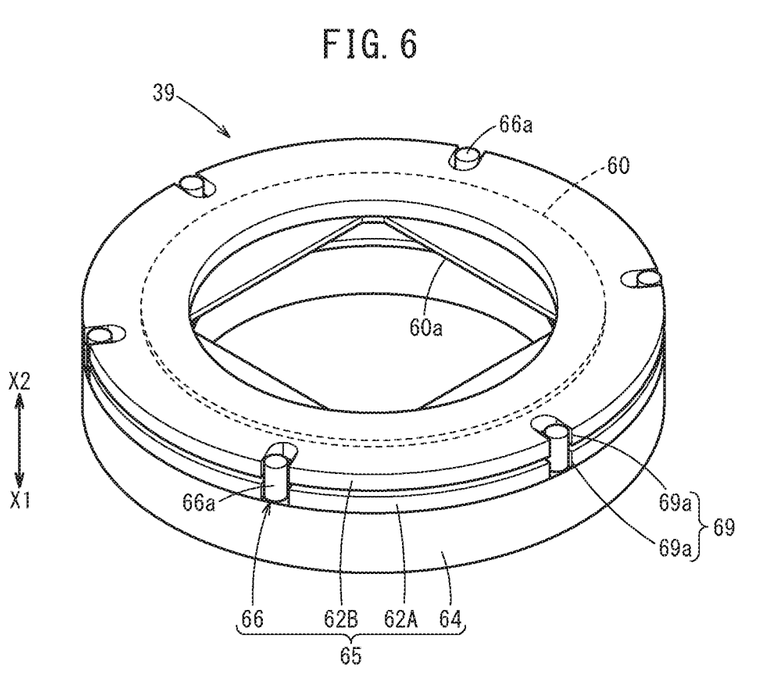
FIG. 6 is a perspective view of the brake mechanism.

As shown in FIG. 6, a plurality (e.g. six) notches 69a are formed at uniform intervals in the circumferential direction in the outer periphery of each of the pair of friction members 62A and 62B. The positions of the notches 69a in the circumferential direction match between the friction members 62A and 62B. In other words, the friction member pair includes, at a plurality of locations (e.g. six locations) on the outer peripheries thereof in the circumferential direction, notch pairs 69 formed respectively by two notches 69a arranged in the axial direction of the rotor 45 (X-axis direction).

The electromagnet 64 is arranged facing the friction member 62A in the pair of friction members 62A and 62B, in the axial direction of the rotor 45 (X-axis direction). The electromagnet 64 is caused to conduct electricity by the control section of the welding robot when the motor 36 is not operating (during the braking operation).

The clamping portion 65 further includes a guide portion 66 that guides the movement of the pair of friction members 62A and 62B in the axial direction of the rotor 45 (X-axis direction). The guide portion 66 includes guide pins 66a that extend in the X-axis direction and enter the respective notch pairs 69 of the friction member pair. In other words, the pair of friction members 62A and 62B are displaceable along the plurality of guide pins 66a. Each guide pin 66a is supported by the brake housing 39a.

The clamping portion 65 is not limited to the configuration described above, and only needs to have a configuration for stopping the rotation of the brake disc 60 by clamping the brake disc 60 during the braking operation.

The following describes the operation and effect of the welding gun 10 configured in the manner described above.

When the motor 36 is operated to move the movable electrode 14 shown in FIG. 1 back and forth (non-braking operation), e.g. when exchanging the workpiece, or transitioning between the spot welding with the welding gun 10 and the moving of the welding gun 10, the control section of the welding robot does not cause conduction through the electromagnet 64 shown in FIG. 4. When there is no conduction through the electromagnet 64, there is a clearance between each of the friction members 62A and 62B in the pair and the brake disc 60, due to the effect of the leaf spring (not shown in the drawings) described above. At this time, the pair of friction members 62A and 62B do not clamp the brake disc 60. Due to this, a frictional force around the axis of the rotor 45 (a force restricting the rotation around the X-axis) is not applied to the brake disc 60, and therefore the braking force is not applied to the rotor 45 that is provided integrally with the brake disc 60. In this way, the back and forth movement of the movable electrode 14 that accompanies the driving of the motor 36 shown in FIG. 1 is allowed.

When the motor 36 is not operated (during the braking operation), e.g. when spot welding with the welding gun 10 is performed or when the welding gun 10 moves, the control section of the welding robot causes conduction through the electromagnet 64 shown in FIG. 4. When conduction occurs through the electromagnet 64, an attractive force that is against the bias force of the leaf spring described above (an electromagnetic force pulling toward the electromagnet 64 side) acts on the pair of friction members 62A and 62B from the electromagnet 64. At this time, the friction member 62A is guided by the guide portion 66 shown in FIG. 6 and displaced to the electromagnet 64 side (X1 side), and the friction member 62B is guided by the guide portion 66 and displaced to the electromagnet 64 side (X1 side) while pushing the brake disc 60.

As a result, as shown in FIG. 4, the pair of friction members 62A and 62B clamp the brake disc 60. Due to this, the frictional force around the axis of the rotor 45 (the force restricting the rotation around the X-axis) is applied to the brake disc 60, and therefore the rotation of the brake disc 60 is prevented. In this way, the braking force is applied to the rotor 45 that is provided integrally with the brake disc 60. As a result, the rotation of the screw shaft 30*a* provided integrally with the rotor 45 is prevented, and therefore the unintentional back and forth movement of the movable electrode 14 can be prevented.

As understood from the above description, when conduction occurs in the motor 36 (when the electromagnet 64 is not conducting, i.e. during the non-braking operation), the brake mechanism 39 does not apply the braking force to the rotor 45, and therefore the back and forth movement of the movable electrode 14 is not obstructed. When there is no conduction through the motor 36 (when the electromagnet 64 is conducting, i.e. during the braking operation), the brake mechanism 39 applies the braking force to the rotor 45, and therefore the movable electrode 14 can be prevented from unintentionally moving back and forth.

In the welding gun 10 of the present embodiment described above, the brake mechanism 39 of the electrode moving mechanism 18 includes the annular brake disc 60 that is attached to the outer peripheral surface of the rotor 45 and rotates integrally with the rotor 45, and the clamping portion 65 that prevents the rotation of the brake disc 60 by clamping the brake disc 60 during the braking operation.

In this way, during the braking operation, the brake disc 60 that is attached to the outer peripheral surface of the rotor 45 is clamped by the clamping portion 65. As a result, the braking force can be applied to the rotor 45 of the motor 36 that moves the movable electrode 14 back and forth. Furthermore, since the brake disc 60 is attached to the outer peripheral surface of the rotor 45, an increase in the size of the welding gun 10 can be restricted.

As shown in FIG. 6, the clamping portion 65 includes the pair of friction members 62A and 62B that face each other in the axial direction of the rotor 45 in a manner to sandwich the brake disc 60, the guide portion 66 that guides the movement of the pair of friction members 62A and 62B in the axial direction of the rotor 45, and the electromagnet 64 that is arranged facing the one friction member 62A in the pair of friction members 62A and 62B in the axial direction of the rotor 45. At least the other friction member 62B in the pair of friction members 62A and 62B includes a magnetic body. Therefore, it is possible to realize the brake mechanism 39 that can apply the braking force to the rotor 45 of the motor 36 with a simple configuration.

As shown in FIG. 5, the rotor 45 includes the attachment portion 45*d* to which the brake disc 60 is attached, the attachment portion 45*d* having an outer peripheral surface with a shape other than a circle. The inner peripheral surface 60*a* of the brake disc 60 is fitted to the outer peripheral surface of the attachment portion 45*d*, and the brake disc 60 is capable of being displaced relative to the attachment portion 45*d* in the axial direction of the rotor 45. Therefore, it is possible to displace, relative to the rotor 45, the brake disc 60 in the axial direction of the rotor 45 during the braking operation, and to cause the brake disc 60 to rotate integrally with the rotor 45 during the non-braking operation.

The rotor 45 includes the hollow portion 45*a*, and the moving mechanism portion for moving the movable electrode 14 back and forth includes the ball screw mechanism 30 that has the screw shaft 30*a* that rotates due to the driving of the motor 36. A portion of the screw shaft 30*a* is inserted into the rotor 45 through the open portion that is open at the front end of the rotor 45. Therefore, it is possible to reduce the size of the welding gun 10 in the axial direction of the rotor 45.

The brake mechanism 39 surrounds the screw shaft 30*a*. Therefore, it is possible to reduce the size of the welding gun 10 in the axial direction of the rotor 45.

The electrode moving mechanism 18 includes the shaft 26 that is provided coaxially with the screw shaft 30*a* and is displaced in the axial direction of the rotor 45 in accordance with the rotation of the screw shaft 30*a*, and the annular space AS capable of receiving the rear end portion 26*b* of the shaft 26 (the end portion on the rotor 45 side) is formed between the hollow portion 45*a* and the screw shaft 30*a*. Therefore, it is possible to reduce the size of the welding gun 10 in the axial direction of the rotor 45.

The electrode moving mechanism 18 includes the brake housing 39*a* that houses the motor 36, and the rotor 45 is rotatably supported by the bearing 53 arranged between the brake housing 39*a* and the rotor 45. The bearing 53 is arranged between the stator 47 of the motor 36 and the brake mechanism 39. Therefore, the bearing 53 can stably support the rotor 45.

The brake mechanism 39 and the bearing 53 surround the hollow portion 45*a*. Therefore, it is possible to restrict lengthening of the rotor 45 (increased size of the welding gun 10) caused by providing the brake mechanism 39.

The welding gun 10 further includes the housing (gripping portion) 24 that is gripped by the welding robot, and the brake mechanism 39 is provided near the housing 24. Therefore, the welding robot can stably grip the welding gun 10.

MODIFICATIONS

The configuration of the welding gun 10 according to the embodiment described above can be altered as desired.

Figure 7A:
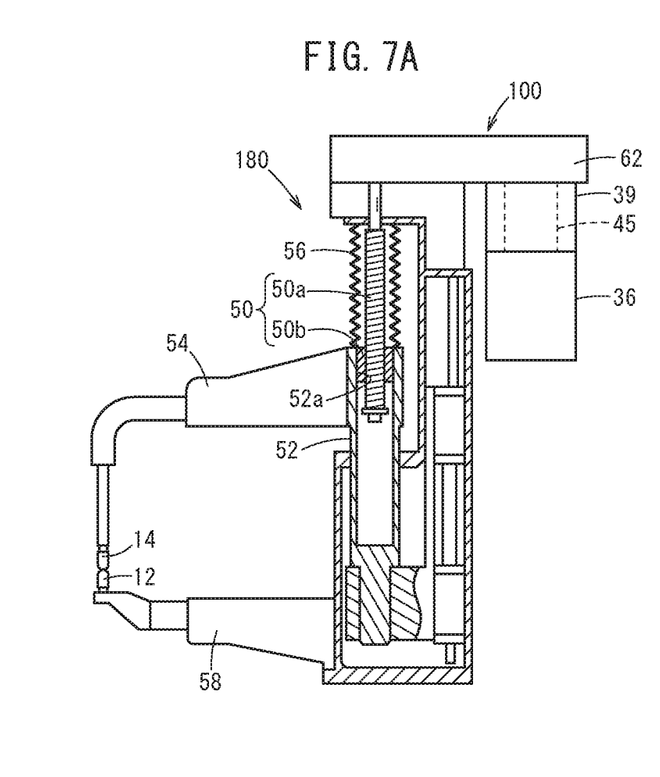
FIGS. 7A and 7B are each a side view of a partial cross section of an overall configuration of a welding gun according to a modification.
Figure 7B:
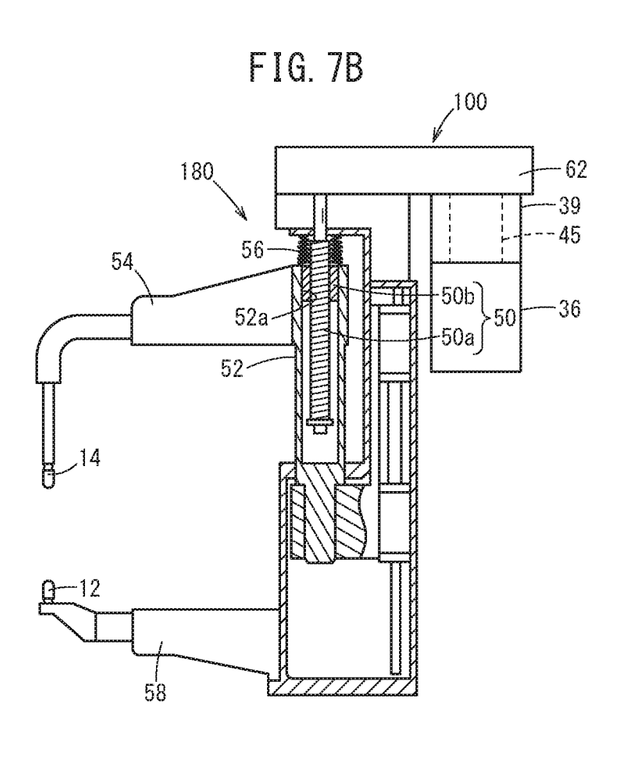

In an electrode moving mechanism 180 of a welding gun 100 of the modification shown in FIG. 7A, a nut 50*b* of a ball screw mechanism 50 is attached to an open end portion 52*a* of a housing 52 to which an arm 54 holding the movable electrode 14 is fixed. In other words, the movable electrode 14 and the nut 50*b* are provided integrally. A bellows-shaped cover member 56 covers a portion of a screw shaft 50*a*. When the drive force of the motor 36 is transmitted, via a driving mechanism 62, to the screw shaft 50*a* as rotational force, the nut 50*b*, the housing 52, the arm 54, and the movable electrode 14 move together in a direction in which the screw shaft 50*a* extends, relative to an arm 58 holding the fixed electrode 12, and the cover member 56 expands or contracts in the X-axis direction (see FIGS. 7A and 7B). In this modification as well, the brake mechanism 39 is provided in the same manner as in the embodiment described above, and applies the braking force to the rotor 45 when the motor 36 is not conducting (during the braking operation).

What is claimed is:

1. A resistance welding apparatus that welds a workpiece by conducting electricity through the workpiece via an electrode, the resistance welding apparatus comprising:
   an electrode moving mechanism configured to move the electrode back and forth,
   wherein the electrode moving mechanism comprises:
      a moving mechanism portion configured to move the electrode back and forth;
      a motor comprising a rotor and configured to drive the moving mechanism portion to move the electrode back and forth; and
      a brake mechanism configured to prevent rotation of the rotor during a braking operation,
   wherein the brake mechanism comprises:

an annular brake disc attached to an outer peripheral surface of the rotor and configured to rotate integrally with the rotor; and a clamping portion configured to prevent rotation of the brake disc by clamping the brake disc during the braking operation;

wherein the moving mechanism portion comprises:
 a screw shaft that rotates by being driven by the motor and is joined to the rotor in a manner to be unable to rotate relative to each other; and
 a shaft that is provided coaxially with the screw shaft and configured to be displaced in an axial direction of the rotor in accordance with rotation of the screw shaft, and wherein the rotor comprises:
 a hollow portion that has a long tube shape and is positioned on a front end side, wherein the screw shaft is inserted into the hollow portion through an open portion that is open at a front end of the hollow portion, and the hollow portion forms, between the hollow portion and the screw shaft, an annular space capable of receiving an end portion of the shaft, and
 an attachment portion that protrudes radially outward from an outer periphery of the hollow portion, wherein the brake disc is attached to the attachment portion.

2. The resistance welding apparatus according to claim 1, wherein
the clamping portion includes:
 a pair of friction members facing each other in an axial direction of the rotor in a manner to sandwich the brake disc;
 a guide portion configured to guide movement of the pair of friction members in the axial direction; and
 an electromagnet arranged facing one friction member of the pair of friction members in the axial direction, wherein the other friction member of the pair of friction members includes a magnetic body.

3. The resistance welding apparatus according to claim 1, wherein
an inner peripheral surface of the brake disc is fitted to the outer peripheral surface of the attachment portion, and
the brake disc is configured to be displaced relative to the attachment portion in an axial direction of the rotor.

4. The resistance welding apparatus according to claim 1, wherein
the brake mechanism surrounds the screw shaft.

5. The resistance welding apparatus according to claim 1, wherein
the electrode moving mechanism includes a housing configured to house the motor,
the rotor is rotatably supported by a bearing arranged between the housing and the rotor, and
the bearing is arranged between a stator of the motor and the brake mechanism.

6. The resistance welding apparatus according to claim 5, wherein
the brake mechanism and the bearing surround the hollow portion.

7. The resistance welding apparatus according to claim 1, further comprising a gripping portion gripped by a welding robot, wherein
the brake mechanism is provided near the gripping portion.

8. The resistance welding apparatus according to claim 1, wherein
the rotor includes a hollow portion,
the moving mechanism portion includes a ball screw mechanism having a screw shaft configured to rotate due to driving of the motor, and
a portion of the screw shaft is inserted into the rotor through an open portion that is open at a front end of the rotor.

* * * * *